United States Patent [19]
Beagle

[11] Patent Number: 5,797,629
[45] Date of Patent: Aug. 25, 1998

[54] HOSE COUPLING AND METHOD OF SECURING A HOSE TO THE COUPLING BY CRIMPING

[75] Inventor: Leo Beagle, Payne, Ohio

[73] Assignee: Dana Corporation, Toledo, Ohio

[21] Appl. No.: 633,085

[22] Filed: Apr. 16, 1996

[51] Int. Cl.$^6$ ................................................. F16L 33/22
[52] U.S. Cl. .................................... 285/256; 285/259
[58] Field of Search ................................ 285/256, 259, 285/381

[56] References Cited

U.S. PATENT DOCUMENTS

| | | | |
|---|---|---|---|
| 2,273,398 | 2/1942 | Couty et al. ...................... | 285/256 |
| 3,530,900 | 9/1970 | Kish . | |
| 4,226,446 | 10/1980 | Burrington . | |
| 4,319,774 | 3/1982 | Kavick . | |
| 5,044,671 | 9/1991 | Chisnell et al. .................. | 285/256 |
| 5,199,751 | 4/1993 | Beagle et al. . | |
| 5,209,524 | 5/1993 | Corwon et al. . | |

FOREIGN PATENT DOCUMENTS

| | | | |
|---|---|---|---|
| 1450423 | 3/1969 | Germany ........................... | 285/256 |
| 4038955 | 6/1992 | Germany ........................... | 285/256 |
| 4131587 | 5/1992 | Japan ................................ | 285/256 |
| 985544 | 12/1982 | U.S.S.R. ............................ | 285/256 |
| 637994 | 5/1950 | United Kingdom ............... | 285/256 |
| 905381 | 9/1962 | United Kingdom ............... | 285/256 |

*Primary Examiner*—Eric K. Nicholson
*Attorney, Agent, or Firm*—Millen, White, Zelano, & Branigan, P.C.

[57] ABSTRACT

A hose coupling includes a crimping collar which is crimped about a reinforced rubber hose with an array of crimps which are offset in both the axial and circumferential directions. The array of the crimps thus assumes a "checkerboard" configuration. In accordance with the method of producing the array of crimps, the crimping operation is performed using first and second die segments wherein the die segments have ribs for forming the crimps, which ribs are placed at different axial locations. The die segments alternate; consequently, the resulting crimps are spaced both axially and circumferentially.

2 Claims, 3 Drawing Sheets

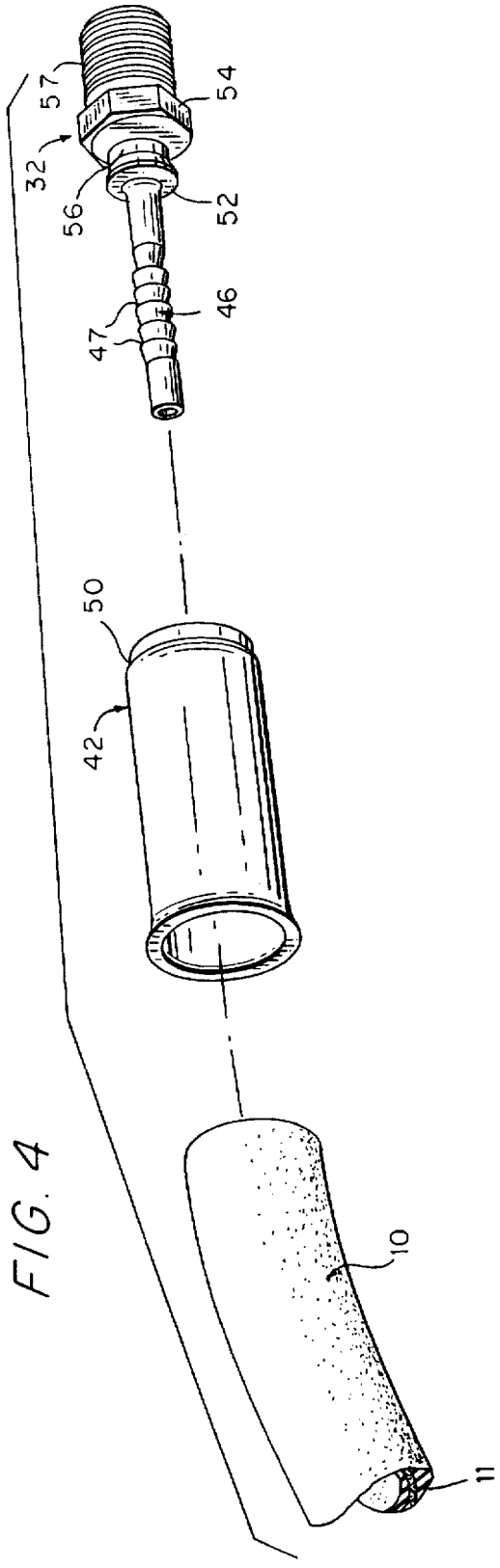
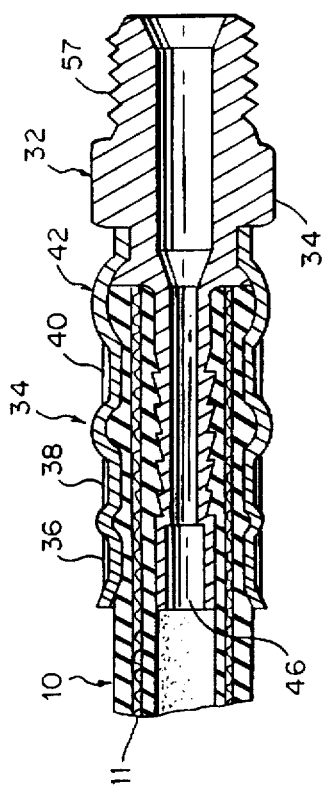
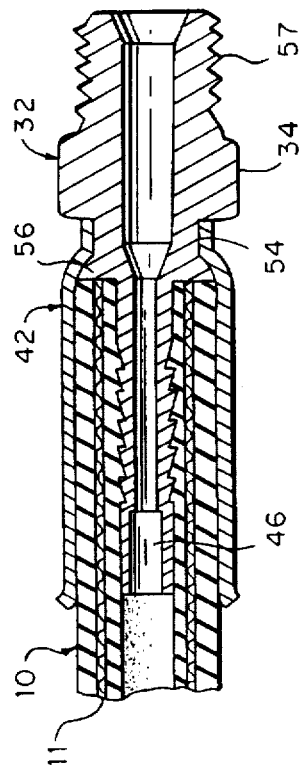

5,797,629

1

HOSE COUPLING AND METHOD OF SECURING A HOSE TO THE COUPLING BY CRIMPING

FIELD OF THE INVENTION

The present invention relates to a hose coupling and to a method of securing a hose to a coupling by crimping. More particularly, the present invention relates to hose couplings having a hose secured thereto by crimping and to methods of crimping a collar around a hose to secure the hose to a tubular insert portion of a nipple.

BACKGROUND OF THE INVENTION

Pressure hose couplings are used in many situations to connect flexible hoses to relatively moveable machinery parts. These hoses transmit hydraulic fluids or compressed air under high pressure between components such as pumps, valves and hydraulic actuators. The flexibility of hoses permits relative movement between the machine ports.

Pressure hoses have ends which are permanently attached to coupling assemblies having tubular inserts which extend into the bores of the hoses and outer sleeves which extend over the outer surfaces of the hoses for substantially the same length that the tubular inserts extend within the hoses. The outer sleeves are generally separate parts from the inserts and are permanently secured to the inserts to provide annular spaces for receiving the ends of the hoses. In accordance with a widely used procedure, the outer sleeves or collars are crimped around the hoses to mechanically squeeze the hoses into tight engagement with the tubular inserts.

It is important with hose coupling assemblies that hoses seal with the coupling assemblies so as not to allow fluid within the hoses to leak to the exteriors of the coupling assemblies. It is also important to grip hoses with sufficient force so that axial pressure exerted when the hoses are pressurized prevents physical separation of the couplings from the hoses.

Generally, two styles of crimping are currently practiced: a "flat style" and a "bubble style." In the flat style, a plurality of parallel, longitudinally extending crimps are made in the collar and in the bubble style, at least one array of circumferentially arranged crimps are made in the collar. With the flat style, there is the risk of the crimping collar cracking because each of the crimps are squeezed between the crimp dye for an extended length. Moreover, hose rubber is stretched over the entire length of the coupling which may result in breakage of reinforcing wire within the hose due to axial stress. In addition, flat style or longitudinal crimps generally have only one circumferential shoulder which opposes axial withdrawal of the hose from the crimping collar. Accordingly, flat style crimps do not necessarily maximize the resistance which might be available to resist pulling forces on the hoses with respect to the couplings.

Bubble style crimps generally comprise a pair of circumferential crimping arrays which are axially spaced. The resulting crimp has high pressure areas and low pressure areas which results in couplings which are not suitable for high pressure applications.

SUMMARY OF THE INVENTION

In view of the aforementioned considerations, it is a feature of the present invention to provide a new and improved hose coupling in which a new and improved crimping arrangement is utilized.

2

In view of this feature and other features, a hose coupling having a nipple with an insertion tube and a collar coaxially disposed around the insertion tube in spaced relation thereto, defines an annular space for receiving an end portion of a hose which is secured to the coupling by crimping. In accordance with the improvement of the present invention, a plurality of crimps are formed in the collar wherein each crimp is spaced both axially and circumferentially from adjacent crimps so as to deform the hose and hold the hose in engagement with the insertion tube.

In accordance with a further aspect of the invention, a method is employed for achieving the aforementioned crimping pattern, wherein crimping die segments are arranged in alternating fashion with the ribs of adjacent dies spaced different axial distances in adjacent dies.

BRIEF DESCRIPTION OF THE DRAWINGS

Various other features and attendant advantages of the present invention will be more fully appreciated as the same becomes better understood when considered in conjunction with the accompanying drawing, in which like reference characters designate the same or similar parts throughout the several views, and wherein:

FIG. 4 is an exploded view showing a hose, collar and nipple which are assembled coaxially prior to crimping in accordance with the principles of the present invention;

FIG. 5 is a side view, partially in section, showing the collar of FIG. 4 crimped to the nipple before the hose is inserted in an annular space between the collar and nipple prior to crimping the collar in accordance with the crimping pattern of the present invention;

FIG. 6 is a side elevation of the coupling crimped in accordance with the principles of the present invention;

DETAILED DESCRIPTION

Figure 1:
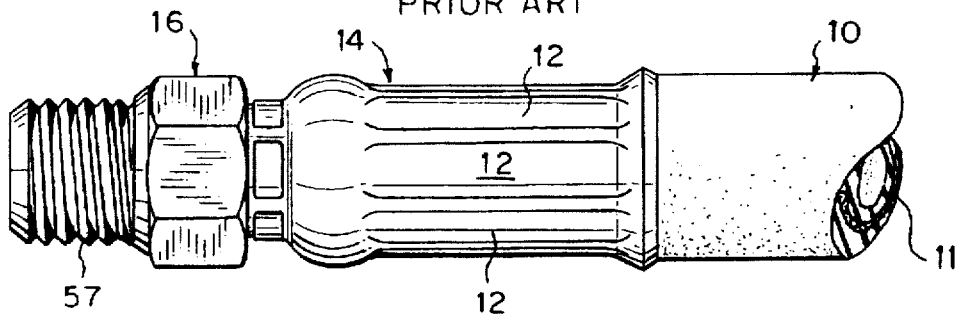
FIG. 1 is a side view of a prior art hose coupling utilizing a "flat style" crimp to crimp a hose to the coupling.

Referring now to FIG. 1, there is shown a first prior art arrangement wherein a hose 10 with steel wire reinforcement 11 is crimped by longitudinal crimps 12 in a collar 14 to a nipple 16, wherein the crimps are longitudinal or "flat style" crimps.

Figure 2:
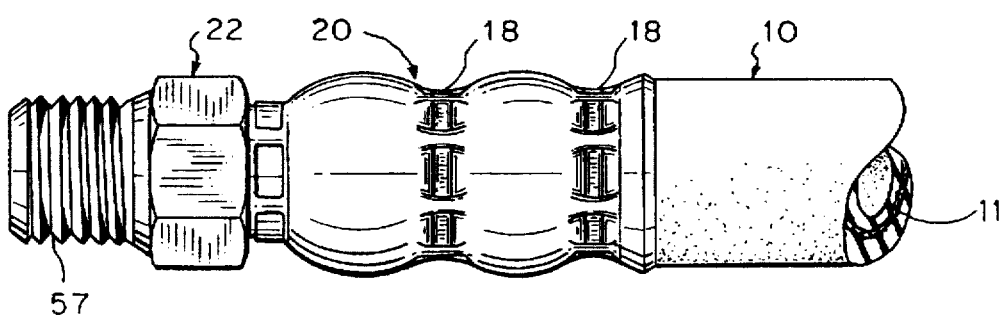
FIG. 2 is a side view of a prior art hose coupling utilizing a "bubble style" crimp to secure a hose to a coupling.

Referring now to FIG. 2, there is shown a second prior art arrangement wherein a hose 10 is crimped by a pair of circumferential crimping arrays 18 in a collar 20 to a nipple 22 to form a "bubble style" crimping arrangement.

As has been previously discussed in the "Background of the Invention", the prior art crimping styles of FIGS. 1 and 2 have several deficiencies. These deficiencies are addressed by the crimping arrangement 30 of FIG. 3, wherein the reinforced hose 10 is retained on a nipple 32 by an array 34 of crimps 36, 38 and 40 in a crimping collar 42. The array 34 of crimps 36, 38 and 40 is a "checkerboard style" array rather than the "flat style" of FIG. 1 or the "bubble style" of FIG. 2.

Figure 3:
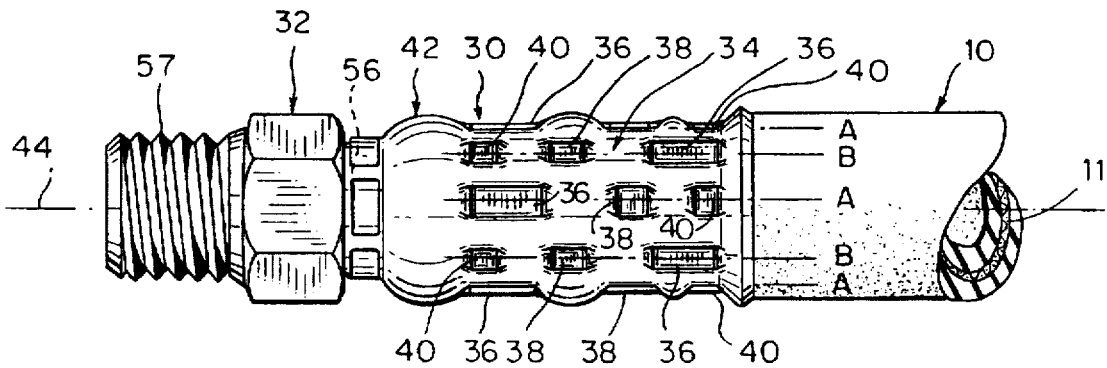
FIG. 3 is a side view of a coupling which utilizes a crimping pattern in accordance with the principles of the present invention to secure a hose to the coupling.

As is seen in FIG. 3, each of the crimps 36, 38 and 40 are spaced both axially in the direction of axis 44 from adjacent crimps and circumferentially from adjacent crimps. With this arrangement, cracking of the collar 42, which is a problem with the flat style crimping in the collar 14 of FIG. 1, is minimized because the crimps 36, 38 and 40 break the elongated stress area that is generated between the die segments of the longitudinal crimps 12 of FIG. 1. Moreover, the steel wire reinforcement 11 of the hose 10 is not subject to as much axial stress in the crimping array 34 of FIG. 3 as with the longitudinal crimps 12 of FIG. 1. In addition, there are a plurality of axially facing shoulders distributed over the length as well as the circumference of the crimp which resist pulling forces on the hose 10 that tend to separate the hose from the nipple 32. Accordingly, the "checkerboard style" array 34 of crimps 36, 38 and 40 has a number of advantages over the flat style longitudinal crimps 12 of FIG. 1.

Upon comparing the array 34 of crimps 36, 38 and 40 to the circumferential array of crimps 18 shown in FIG. 2, it is seen that the "checkerboard style" crimping array differs substantially from the "bubble style" crimping arrangement of FIG. 2. With the bubble style arrangement of FIG. 2, there is uneven pressure distribution on an insertion tube 46 with annular barbs 47 (see FIGS. 4, 5 and 9) within the hose 10. Crimping array 34 is suitable for high pressure applications whereas the bubble style crimp created by the circumferential array of crimps 18 of FIG. 2 is not suitable for high pressure applications.

Referring now to FIGS. 4 and 5, it is seen that the hose 10, crimping collar 42 and nipple 32 are three separate components which are coaxially assembled as in FIG. 5 prior to crimping. The collar 42 has a first end 50 which is slid over a circular flange 52 that is unitary with the tubular insert 46. The circular flange 52 is spaced from a hex nut 54 on the nipple 32 by an intermediate section 56 of a reduced diameter with respect to the hex nut and circular flange. In accordance with a known procedure, the first end 50 of the collar 42 is swaged between the circular flange 52 and the hex nut 54 over the intermediate portion 56 of the insertion tube 46. The crimping collar 42 is therefore fixed axially in non-rotational engagement with the nipple 32 before being crimped in the crimping array 34 of FIG. 3. It is important that the crimping collar 42 not turn with respect to nipple 32 which is threadably secured to a hydraulic or pneumatic device (not shown) by a threaded end 57.

As is seen in FIG. 6, upon crimping the collar 42, the hose 10 is squeezed into locking engagement with the annular barbs 47 on the insertion tube 46. The crimping operation resulting in the structure of FIG. 6 is performed using the crimping die 60 of FIGS. 7-9.

Figure 7:
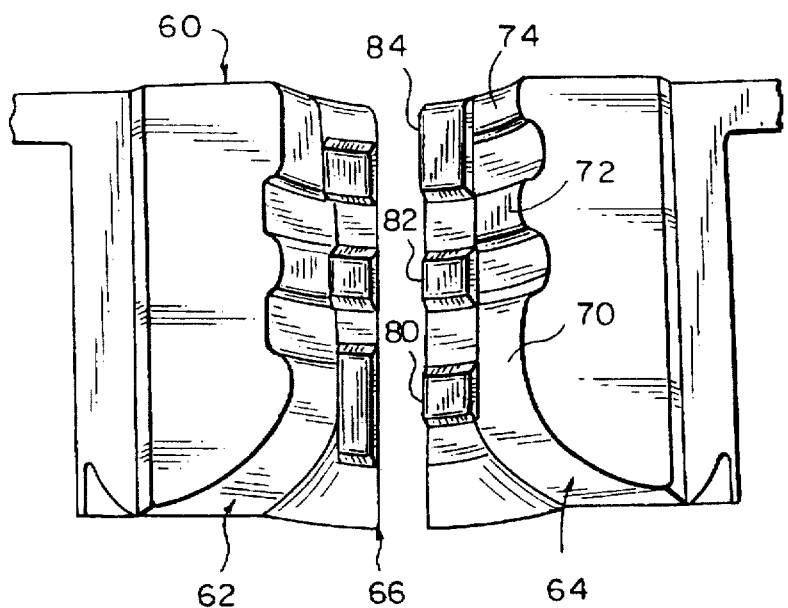
FIG. 7 is a top view showing one-half of a crimping die assembly configured to practice the method of the present invention.
Figure 8:
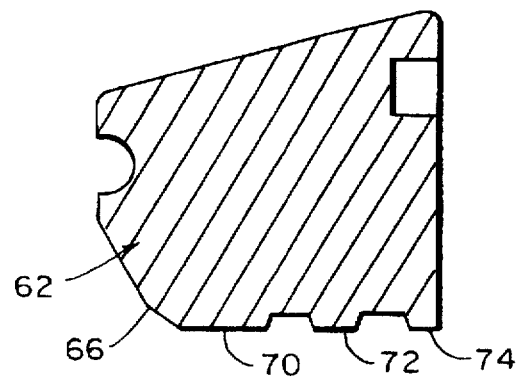
FIG. 8 is an enlarged view of a first die segment employed in the crimping die assembly of FIG. 7.
Figure 9:
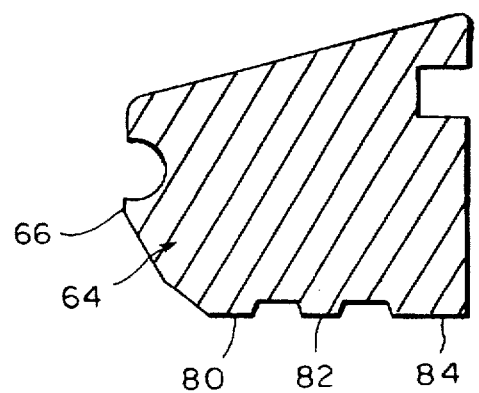
FIG. 9 is an enlarged side view of a second die segment employed in the crimping die assembly of FIG. 7.

Referring now to FIGS. 7-9 where the crimping die 60 configured in accordance with the principles of the present invention is shown, it is seen that the crimping die has alternating die segments 62 and 64. For purposes of clarity, only one-half of the crimping die 60 is shown in FIG. 7. It is to be understood that the die segments 62 and 64 are arranged circularly and are preferably eight in number. In operation, the uncrimped collar and hose assembly of FIG. 5 is inserted into the die 60 at a first end 66 of the die. The die 60 is then squeezed uniformly in the radial direction so that the die segments 62 and 64 impinge on the surface of the crimping collar 42.

As is seen in FIGS. 7, 8 and 9, the die segments 62 and 64 differ from one another. The die segment 64 has ribs 70, 72 and 74 which upon engaging the crimping collar 42 form the crimping impressions 36, 38 and 40, respectively along longitudinal crimping lines A of FIG. 3. Die segment 62 has ribs 80, 82 and 84 7 which form the crimps 40, 38 and 36, respectively along longitudinal crimping lines B of FIG. 3. By alternating the dies 62 and 64 in a circular array, the checkerboard crimping array 34 of FIG. 3 is created, wherein adjacent crimps 36, 38 and 40 are always axially and radially spaced from one another.

Considering this point further, it is seen that the order of ribs is reversed when comparing FIG. 9 to FIG. 8. The rib 70 of die segment 62 is a relatively long rib while the rib 80 of the adjacent die segment 64 is a relatively short rib. The rib 70 terminates further from the first end 66 of die segment 62, than the rib 80 of the die segment 64 while the rib 72 of die segment 62 both begins and terminates further from the first end 66 of the die segment 62 than the rib 82 of the die segment 64. Finally, the rib 74 of the die segment 62 begins further from the end 66 than the rib 84 of the die segment 64. Since the die segments 62 and 64 are arranged side-by-side, the individual crimps 36, 38 and 40 made along the adjacent lines of crimps A and B are staggered.

As is seen in FIG. 6, after squeezing the die segments 62 and 64 of the die 60 against the collar 42, the hose 10 is in engagement with the insertion tube 46 so that annular teeth 47 at the external surface of the insertion tube bite into the internal surface of the hose 10. Consequently, the hose 10 is fixed to the coupling 30.

In the preferred embodiment of the invention, the crimping collar 42 is steel, but it should be kept in mind that the crimping collar 42 may be of any suitable material.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A hose coupling having a nipple with an internal insertion tube and a collar coaxially disposed around the insertion tube in spaced relation thereto to form an annular space for receiving an end of a hose, the hose coupling comprising:

an array of crimps in the collar, wherein each crimp is spaced both axially and circumferentially from adjacent crimps to deform the collar into the hose and to hold the hose in engagement with the insertion tube, the array of crimps being arranged with first and second alternating lines of three crimps each, wherein each of the crimps in the lines of crimps is longitudinally spaced from the adjacent crimps and wherein the crimps of the first line of crimps are staggered with respect to the crimps of the second line of crimps, wherein in each line there is a relatively long crimp and two relatively short crimps with the long crimp being at an end of the line, and wherein the ends of alternating crimps lines have a long crimp proceeding the short crimps in the first lines and the long crimps trailing the short crimps in the second lines.

2. The improvement of claim 1, wherein the hose is reinforced with metal wire and wherein the metal wire is intermittently stressed in the axial direction by the crimps.

\* \* \* \* \*